United States Patent Office 3,598,590
Patented Aug. 10, 1971

3,598,590
HETEROCYCLIC COMPOUNDS WITH ETHER OR THIOETHER GROUPS AS SILVER HALIDE SENSITIZERS
Harald Hückstadt, Cologne, Stammheim, Wilhelm Saleck, Schildgen-Bergisch-Gladbach, and August Randolph and Erwin Ranz, Leverkusen, Germany, assignors to Agfa-Gevaert Aktiengesellschaft, Leverkusen, Germany
No Drawing. Filed Dec. 18, 1967, Ser. No. 691,231
Claims priority, application Germany, Dec. 27, 1966,
A 54,478
Int. Cl. G03c 1/28, 5/30
U.S. Cl. 96—66    14 Claims

ABSTRACT OF THE DISCLOSURE

Chemical sensitizers having the formula

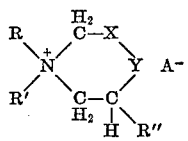

wherein:

R and R' are alkyl with up to 18 carbon atoms, or together represent the ring members necessary for completing a 5-, 6- or 7-membered heterocyclic ring,
X is oxygen or sulfur; Y is a chemical bond or a methylene group;
R" is hydrogen, hydroxyl, esterified hydroxyl, the group —CH$_2$—S—Z in which Z represents acyl, an aminomethyl group, aryl, aralkyl,
A is any anion increase the sensitivity of photographic silver halide emulsions when incorporated in the emulsions or in the developers used to develop the emulsions after exposure. When used in color-forming developers with multi-layer emulsions in which a red-sensitive emulsion is covered by a green-sensitive emulsion which in turn is covered by a blue-sensitive emulsion, the lowermost emulsion has its sensitivity increased more than the middle one and the uppermost emulsion has its sensitivity increased less than the middle one or actually decreased. The foregoing chemical sensitizers can be used with other chemical sensitizers.

A number of methods have been described for improving the sensitivity of photographic silver halide emulsions other than by optical or spectral sensitization through the incorporation of certain sensitizing dyes in the emulsion. The incorporation of such dyes in the emulsion increases the optical or spectral range of sensitivity, and for this reason such dyes are commonly referred to as optical or spectral sensitizing dyes. Contrary to such optical or spectral sensitizers, the so-called chemical sensitizers are believed to react with silver halide to form, on the surface of the silver halide grain, sensitivity specks the chemical nature of which depends on the kind of the chemical sensitizer. The sensitivity of silver halide emulsions can be increased by chemical ripening or after-ripening during the preparation of the emulsion, by either prolonging the ripening time or by the addition of suitable substances such as compounds of noble metals or thiosulfate or other sulfur compounds. According to another method customarily employed the sensitivity of a photographic emulsion can be increased by the addition of development accelerators or chemical sensitizers to the emulsion, usually when it is completely ripened.

Suitable development accelerators are, for example, compounds containing onium groups (for example, quaternary ammonium or phosphonium and ternary sulfonium salts) and polyalkylene oxides and derivatives of polyalkylene oxides.

The process of chemical sensitization, however, reaches a limit beyond which further addition of sensitizing compounds or of prolonged digestion in the presence of a sensitizer, merely increase the undesired fog of the photographic emulsions.

In particular with respect to polyalkylene oxide sensitizers, many attempts have been made to increase the sensitizing action by modifying the chemical structure or by using them in combination with other compounds. However, in practice, none of these compounds completely meet the requirements as regards producing a satisfactory increase in sensitivity without concomitant increases in fog or poor keeping qualities.

The object of the present invention is to provide new chemical sensitizers which do not suffer the above disadvantages. Another object is to provide photographic silver halide emulsions having increased sensitivity and satisfactory keeping qualities.

We now have found that the sensitivity of an ordinary photographic silver halide emulsion can be substantially increased by adding to the emulsion quaternary salts of the following formula:

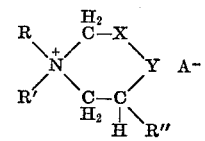

wherein:

R and R'=alkyl with up to 18 carbon atoms, preferably up to 12 carbon atoms, or aralkyl such as benzyl or phenylethyl; or R and R' together represent the ring members necessary for completing a 5-, 6- or 7-membered heterocyclic ring, for example, piperidinyl, pyrrolidinylmorpholinyl, thiomorpholinyl or piperazinyl or a spirocyclic group of the following formula, in which case bis-functional quaternary salts are obtained:

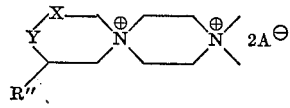

X=oxygen or sulfur;
Y=a chemical bond or a methylene group;
R"=(1) hydrogen, (2) hydroxyl, (3) esterified hydroxyl, preferably with aliphatic carboxylic acids with up to 18 carbon atoms, acetic acid in particular, or (4) the group —CH$_2$—S—Z in which Z represents (i) acyl preferably derived from aliphatic carboxylic acids with up to 6 carbon atoms, acetyl in particular, (ii) an aminomethyl group whose amino group may contain the substituents R or R' (iii) alkyl with preferably up to 12 carbon atoms; (iv) cycloalkyl such as cyclohexyl; (v) aryl, in particular a radical of the phenyl series or (vi) aralkyl such as benzyl or phenylethyl; and
A=any anion, such as perchlorate ions or halogen ions, preferably bromide or a tosylate anion.

The above substitutents may, of course, carry any other substituents. The only requirement these other substituents have to satisfy is that they should not in any way impair the sensitivity-increasing effect of the compounds and should not exert any harmful influences on the photographic properties of the emulsions treated with the sensitizers used according to the invention.

Particular utility is exhibited by compounds of the following formulae:

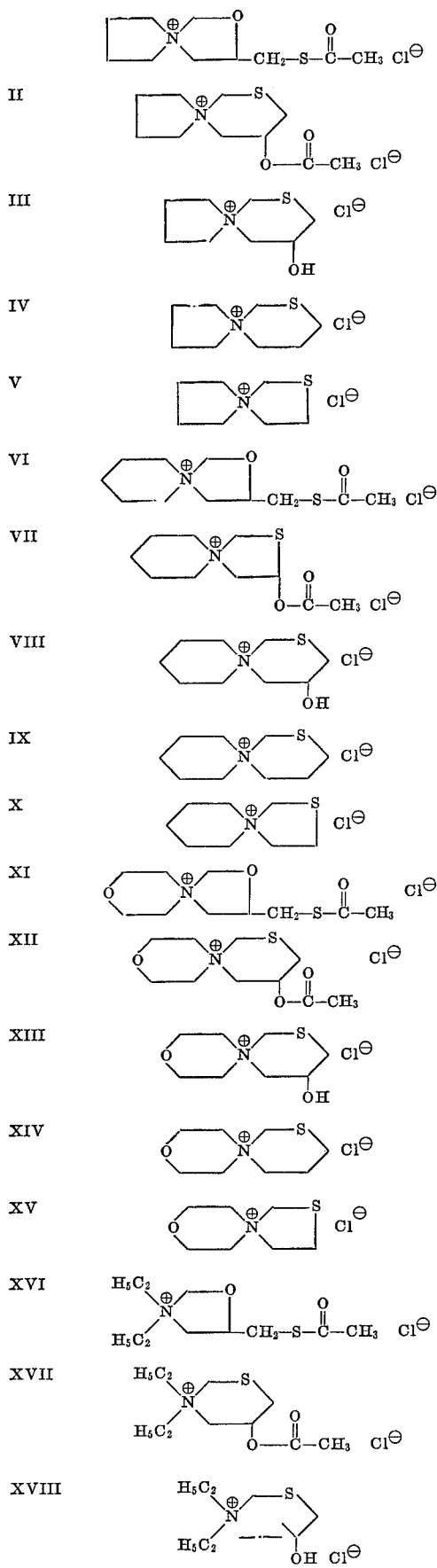
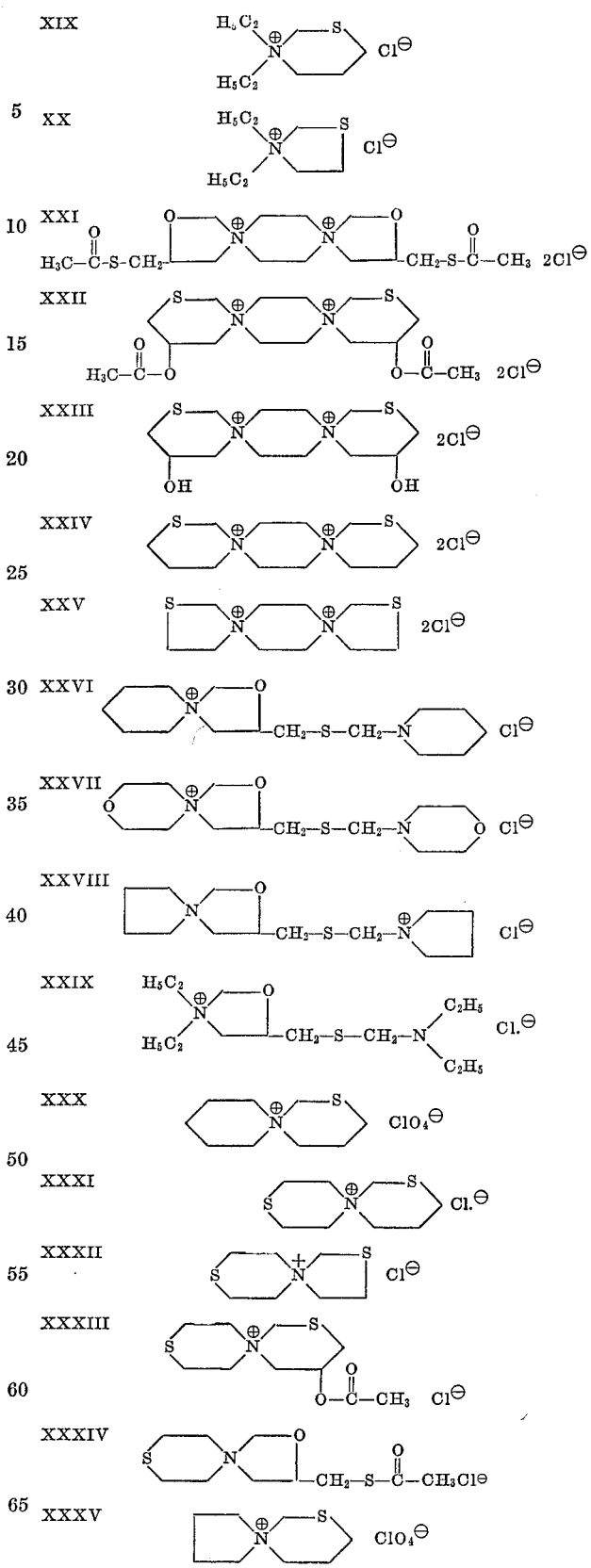

The preparation of the above compounds is described in Journal of Heterocyclic Chemistry 2 (1965), pp. 430–440.

The compounds according to the invention can be used in any silver halide emulsion. Silver halides which may be used are silver chloride, silver bromide or mixtures thereof, if desired with a small amount of silver iodide of up to 10 mols percent. The silver halides can be dispersed in the usual hydrophilic compounds, for example, in carboxymethyl cellulose, polyvinyl alcohol, polyvinyl pyrrolidone, alginic acid and its salts, esters or amides, and preferably in gelatin.

The preparation of photographic silver halide emulsions includes 3 separate steps:

(1) emulsification and physical ripening which is also called Ostwald ripening;
(2) the freeing of the emulsion of excess water-soluble salts, usually by washing with water and drying, and
(3) chemical or after-ripening to obtain increased emulsion speed or general sensitivity.

The sensitizer of the present invention can be added to the emulsion before, during or after the chemical ripening or they can be added immediately prior to the casting. In many cases it has proved advantageous to add the chemical sensitizer of the present invention before or during the after-ripening.

The particular quantity of the sensitizers of the invention used in a given emulsion can vary, depending upon the effects desired, the silver content of the emulsion, the silver halide composition etc. The amount used is also dependent upon the particular stage at which the sensitizer was added during the preparation of the emulsion. Generally they are added in amounts of 0.003 to 20 g. preferably 0.003 to 0.6 g. per mol of silver halide. If added prior to casting after the after-ripening, the amount used is slightly higher for instance 0.005–20 g. preferably 0.005–6 g. per mol of silver halide.

The sensitizers can be dissolved in water or a solvent miscible with water or a mixture of water and water miscible solvents, and added in such form to the emulsion. The solvent is not critical and should be selected so that it should have no harmful effect on the photographic properties of the silver halide emulsion.

The optimum amount for any sensitizer of the present invention can be determined for any particular emulsion by running a series of comparison tests in which the quantity of the sensitizer is varied over a given range. Exposure of the emulsion containing the sensitizer in a manner well known and measuring of the sensitivity in conventional apparatuses will reveal most advantages concentrations. Such technique is well understood by those skilled in the art.

The emulsions may also contain other chemical sensitizers, for example, quaternary ammonium and phosphonium and ternary sulphonium salts, reducing agents such as stannous salts, polyamines such as diethylene triamine, or sulfur compounds of the kind described in U.S. Pat. No. 1,574,944. For chemical sensitization, the aforementioned emulsions may also contain salts of noble metals such as ruthenium, rhodium, palladium, iridium, platinum or gold, as described in the Article by R. Koslowsky, in Z. Wiss. Phot., 46, 65–72 (1951).

According to a preferred embodiment of the invention, the spirocyclic quaternary salts are used in combination with chemical sensitizers of the polyalkylene oxide type. Suitable compounds of this type are, for example, those of the following formula:

$$R.O-(CH_2.CH_2.O)_n-R$$

wherein:

R=denotes a hydrogen atom or an alkyl group with preferably up to 18 carbon atoms such as an ethyl or dodecyl, an acyl group, preferably an acyl radical of an aliphatic carboxylic acid having up to 18 carbon atoms such as lauric acid or oleic acid, or an aryl group such as phenyl or p-dodecylphenyl;
$n$=an integer between 8 and 200.

The ethylene oxide groups $CH_2.CH_2.O$ may be substituted for instance with alkyl having up to 18 carbon atoms. Molecular weights of from 1500 to 10,000 are preferred for the polyethylene oxides, examples of which are described in U.S. Pats. 2,240,472 and 2,400,532.

Other suitable chemical sensitizers that can be used with the sensitizers of the present invention are derivatives of phosphoric acid which contain polyalkylene oxide chains. Suitable products have been described in British Pats. Nos. 1,045,183 and 1,045,184 or French Pats. Nos. 1,396,860 and 1,423,680.

Such compounds are condensation products of spirocyclic pentaerythritol-di-phosphoric acid monohalides and polyethylene glycols containing about 3 to 100 ethylene oxide units in the molecule. They correspond to the following formula:

$$R_1-\left[-O-\overset{O}{\underset{\|}{P}}\overset{O-CH_2}{\underset{O-CH_2}{\diagdown}}C\overset{CH_2-O}{\underset{CH_2-O}{\diagdown}}\overset{O}{\underset{\|}{P}}-(OCH_2.CH_2)_m\right]_Y-OH$$

wherein:

$R_1$=a hydrogen atom or an alkylene oxide chain having 3 to 100 alkylene oxide units;
$m$=an integer from 3 to 100 and
$Y$=an integer from 1 to 10.

This group of chemical sensitizers also includes the condensation products of amidophosphoric acid derivatives and polyethylene glycols of the above mentioned type. Such compounds are represented by the following formula:

$$HO-(CH_2-CH_2-O)_p-\left[\underset{\underset{R_3}{\overset{|}{N}}\diagdown R_2}{\overset{O}{\underset{\|}{P}}}-O(CH_2.CH_2-O)_m\right]_q-H$$

in which:

$R_2$=represents hydrogen, alkyl with preferably up to 18 carbon atoms, aryl such as phenyl, or aralkyl such as benzyl or phenylethyl and $R_3$ represents alkyl with preferably up to 18 carbon atoms, aryl such as phenyl, or aralkyl such as benzyl or phenylethyl or $R_2$ and $R_3$ together represent the ring members necessary for completing a 5- or 6-membered heterocyclic ring;
$m$=is as defined above,
$p$=represents a number from 0 to 100, whilst
$q$=represents a number from 1 to 5.

The chemical sensitizers according to the invention may also be used with advantage in combination with the crosslinked or uncrosslinked water-soluble quaternization products of tertiary polyamines with bis-functional polyalkylene oxide derivatives described in French Pat. No. 1,497,296.

The sensitizers used according to the invention may also be used in combination with polycondensation products of diamines or polyamines with bis-functional organic compounds of the following formulae:

$$\left[-\underset{\underset{}{}}{\overset{H_3C\diagdown\overset{H}{\underset{|}{C}}\diagup CH_3}{}}-N-CH_2CH_2.O-\right]$$

$$\left[CH_2-\overset{OH}{\underset{|}{CH}}-O-(CH_2)_4-O-CH_2-\overset{OH}{\underset{|}{CH}}-CH_2-\right]_x$$

or $$\left[-\underset{\underset{}{}}{\overset{H_3C\diagdown\overset{H}{\underset{|}{C}}\diagup CH_3}{}}-N-CH_2.CH_2O-\right]$$

$$\left[\underset{CH_2.\overset{|}{CH}.CH_2-O-(CH_2)_2-O-CH_2.\overset{|}{CH}.CH_2}{\overset{O.CO.CH=CH.COOH\qquad O.CO.CH=CH.COOH}{}}-\right]_z$$

in which z represents at least 3.

These compounds are described in the published Netherlands patent applications 6614230 and 6711152.

Furthermore, the emulsions may contain stabilizers such as homopolar or salt-type compounds of mercury which contain aromatic or heterocyclic rings (e.g., mercaptotriazoles), simple mercury salts, sulfonium-mercury double salts and other mercury compounds. Other suitable stabilizers are azaindenes, preferably tetra or pentaazaindenes, especially those substituted with hydroxyl or amino groups. Such compounds have been described by Birr, Z. Wiss. Phot., 47, 2–58 (1952). Other suitable stabilizers include heterocyclic mercapto compounds such as phenylmercaptotetrazole, quaternary benzthiazole derivatives and benztriazoles.

The emulsions may also contain optical sensitizers such as the usual polymethine dyes such as neutrocyanines, basic or acid carbocyanines, rhodacyanines, hemicyanines, styryl dyes and oxonoles. Examples of these sensitizers have been described in the work by F. M. Hamer "The Cyanine Dyes and Related Compounds" Interscience Publishers (1964).

The emulsions may be hardened in the usual manner, for example using formaldehyde or halogen-substituted aldehydes which contain a carboxyl group, e.g., mucobromic acid diketones, methane sulfonic acid ester, and dialdehydes.

The quaternary salts of the present invention can be used in black-and-white silver halide emulsions and developers, as well as in color-photographic materials. In this case, they may be added to light-sensitive silver halide emulsions containing color couplers or to color-forming developers.

A particular favourable effect is obtained when they are added to color-forming developers. If a multi-layer color-photographic material is developed is a developer containing one of the compounds according to the invention, red-sensitive layers generally containing the blue-green coupler which are mostly arranged under the green or blue-sensitive layers surprisingly show the greatest increase in sensitivity, whilst the sensitivity of the middle green-sensitive layer, generally containing the magenta coupler, is simewhat less strongly increased. The uppermost blue-sensitive layer, generally containing the yellow coupler, shows only a minor increase in sensitivity or is in some cases slightly less sensitive. Such an effect is desirable because in multi-layer color-photographic materials the bottom layer is frequently under-developed due either to excessively slow diffusion of the developer substance or to an excessively high concentration of KBr. The employment of the substances used according to the invention obviates this disadvantage.

EXAMPLE 1

A silver iodobromide gelatin emulsion is prepared in the usual way. For after-ripening, the pAg-value is adjusted to 8.9, the pH-value to 6.8 and the viscosity to 8 cp. Gold rhodanide is then added to the emulsion which is now divided into eight equal portions. Except for the control specimen, each portion receives the following additives before after-ripening (based on 240 g. of AgBr containing 5 mol percent of AgI):

Specimen A: Control specimen, no additive;
Specimen B: 10 mg. of substance X
Specimen C: 50 mg. of substance X
Specimen D: 10 mg. of substance XV
Specimen E: 50 mg. of substance XV
Specimen F: 10 mg. of substance XX
Specimen G: 50 mg. of substance XX
Specimen H: 100 mg. of substance XX After-ripening is continued until maximum ripening is obtained, after which the specimens are made ready for casting by the addition of 600 mg./liter of saponin as wetting agent, 10 ml./liter of a 10% by weight aqueous formaldehyde solution as hardener and 200 mg. of 4-hydroxy-6-methyl-1,3,3a,7-tetra-azaindene as stabilizer. The emulsions are then cast onto a cellulose acetate support and dried. It is exposed in a sensitometer customarily used in the art of emulsion testing behind a grey step wedge and developed at 20° C. in a developer of the following composition:

| | G. |
|---|---|
| Sodium sulfite (anhydrous) | 70.0 |
| Borax | 7.0 |
| Hydroquinone | 3.5 |
| p-Monomethylaminophenol | 3.5 |
| Sodium citrate | 7.0 |
| Potassium bromide | 0.4 |

Make up with water to 1 liter.

The results of sensitometric evaluation are set out in the following table:

TABLE 1

[Development for 6 minutes]

| Specimen | E | γ | S |
|---|---|---|---|
| A | Standard | 0.55 | 0.14 |
| B | +1° | 0.55 | 0.10 |
| C | +1.5° | 0.55 | 0.12 |
| D | +1° | 0.55 | 0.12 |
| E | +1.5° | 0.55 | 0.12 |
| F | +1° | 0.55 | 0.18 |
| G | +1° | 0.55 | 0.16 |
| H | +1.5° | 0.55 | 0.16 |

NOTE.—In the above table, E represents the sensitivity, γ the gamma-value, and S the fog.

EXAMPLE 2

The same emulsion as in Example 1 is divided into 6 parts and provided with the following additives (again based on 240 g. of AgBr containing 5 mol percent of AgI):

Specimen A: Control specimen, no additive
Specimen B: 10 mg. of substance XXIV
Specimen C: 50 mg. of substance XXIV
Specimen D: 100 mg. of substance XXIV
Specimen E: 10 mg. of substance XXX
Specimen F: 10 mg. of substance XXXV The samples were ripened, cast and developed as described in Example 1.

TABLE 2

[Development for 6 minutes]

| Specimen | E | γ | S |
|---|---|---|---|
| A | Standard | 0.7 | 0.15 |
| B | +1.5° | 0.8 | 0.13 |
| C | +0.5° | 0.8 | 0.19 |
| D | +2° | 0.83 | 0.10 |
| E | +1.5° | 0.7 | 0.11 |
| F | +1° | 0.75 | 0.16 |

EXAMPLE 3

The same emulsion as in Example 1 is divided into 7 parts and provided with the following additives (again based on 240 g. AgBr+5 mol percent of AgI):

Specimen A: Control specimen, no additive
Specimen B: 10 mg. of substance VI
Specimen C: 10 mg. of substance XXIII
Specimen D: 50 mg. of substance XXIII
Specimen E: 100 mg. of substance XXIII
Specimen F: 10 mg. of substance XXI
Specimen G: 50 mg. of substance XXIX The specimens were ripened, applied onto a support, dried and developed as in Example 1.

TABLE 3

[Development for 6 minutes]

| Specimen | E | γ | S |
|---|---|---|---|
| A | standard | 0.68 | 0.12 |
| B | +1° | 0.75 | 0.10 |
| C | +1° | 0.72 | 0.12 |
| D | +0.5° | 0.77 | 0.17 |
| E | +1° | 0.67 | 0.09 |
| F | +1° | 0.75 | 0.09 |
| G | +1.5° | 0.65 | 0.11 |

Examples 1 to 3 show the effectiveness of the compounds according to the invention as ripening agents. Their suitability as casting additives after completion of ripening is demonstrated in the following examples:

EXAMPLE 4

A silver iodobromide emulsion containing per liter 60 g. of silver in the form of silver halide containing 6 mol percent of silver iodide, had added to it 600 mg. of saponin as wetting agent, 200 mg. of 4-hydroxy-6-methyl-1,3,3a,7-tetra-azaindene as stabilizer and 10 ml. of a 10% aqueous solution of formaldehyde.

The emulsion was divided into 6 equal parts to which the following substances were added (based on 1 liter of emulsion):

Specimen A: Control specimen, no additive
Specimen B: 120 mg. of substance XVII
Specimen C: 120 mg. of substance VIII
Specimen D: 120 mg. of substance XIII
Specimen E: 120 mg. of substance XVIII
Specimen F: 120 mg. of substance XIV The resulting casting solutions were cast onto a support of polyethylene terephthalate, dried, exposed in a sensitometer behind a grey step wedge and developed in a developer of the kind described in Example 1.

TABLE 4

| Specimen | Development time 10 mins. | | | Development time 20 mins. | | |
|---|---|---|---|---|---|---|
| | E | γ | S | E | γ | S |
| A | Standard | 0.83 | 0.09 | Standard | 1.8 | 0.15 |
| B | +3° | 0.73 | 0.12 | +3° | 1.6 | 0.22 |
| C | +3° | 0.75 | 0.09 | +2° | 1.55 | 0.16 |
| D | +1.5° | 0.75 | 0.11 | +1° | 1.6 | 0.21 |
| E | +1.5° | 0.68 | 0.47 | +1.5° | 1.1 | 0.90 |
| F | +1.5° | 0.85 | 0.10 | +1.5° | 1.95 | 0.18 |

EXAMPLE 5

The same emulsion as in Example 4 is divided into 10 equal parts to which the following substances are added (based on 1 liter of emulsion):

Specimen A: Control specimen, no additive
Specimen B: 120 mg. of substance VI
Specimen C: 120 mg. of substance IX
Specimen D: 120 mg. of substance III
Specimen E: 120 mg. of substance XXIII
Specimen F: 120 mg. of substance XXI
Specimen G: 120 mg. of substance XXIV
Specimen H: 120 mg. of substance XXXV
Specimen J: 120 mg. of substance XXVII
Specimen K: 120 mg. of substance XXVIII The resulting casting solutions are applied onto a support of polyethylene terephthalate, dried, exposed and developed as described in Example 4.

TABLE 5
[Development for 6 minutes]

| Specimen | E | γ | S |
|---|---|---|---|
| A | Standard | 0.7 | 0.06 |
| B | +2° | 0.7 | 0.07 |
| C | +1.5° | 0.75 | 0.08 |
| D | +1° | 0.73 | 0.10 |
| E | +1.5° | 0.61 | 0.08 |
| F | +1° | 0.68 | 0.12 |
| G | +1° | 0.75 | 0.08 |
| H | +1° | 0.75 | 0.09 |
| J | +2° | 0.62 | 0.16 |
| K | +2° | 0.64 | 0.09 |

EXAMPLE 7

The substances of the present invention may also be combined with other development accelerators. The same emulsion as in Example 4 is divided into 3 equal parts to which the following substances are added (based on 1 liter of emulsion):

Specimen A: Control specimen, no additive
Specimen B: 480 mg. of a substance with the following formula:

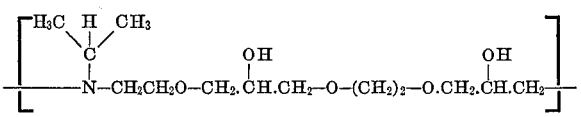

Specimen C:
 120 mg. of substance XXV and
 480 mg. of the substance from specimen B TABLE 7
[Development for 6 minutes]

| Specimen | E | γ | S |
|---|---|---|---|
| A | Standard | 0.63 | 0.06 |
| B | +2.5° | 0.52 | 0.09 |
| C | +4 | 0.57 | 0.08 |

EXAMPLE 8

The emulsion described in Example 4 is divided into 22 parts to which the following substances are added (based on 1 liter of emulsion):

Specimen 1: Control specimen, no additive
Specimen 2: 240 mg. of a polyethylene oxide derivative of the formula:

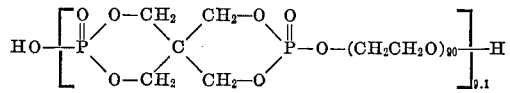

Specimen 3: 120 mg. of substance VI
Specimen 4:
 240 mg. of the substance from specimen 2
 120 mg. of substance VI
Specimen 5: 120 mg. of substance XXIV
Specimen 6:
 120 mg. of substance XXIV and
 240 mg. of the substance from specimen 2
Specimen 7: 120 mg. of substance XXX
Specimen 8:
 120 mg. of substance XXX and
 240 mg. of substance from specimen 2
Specimen 9: 120 mg. of substance XXXV
Specimen 10:
 120 mg. of substance XXXV and
 240 mg. of the substance from specimen 2
Specimen 11: 120 mg. of substance XXVI
Specimen 12:
 120 mg. of substance XXVI and
 240 mg. of the substance from specimen 2
Specimen 13: 120 mg. of substance X
Specimen 14:
 120 mg. of substance X and
 240 mg. of the substance from specimen 2
Specimen 15: 120 mg. of substacne XXV
Specimen 16:
 120 mg. of substance XXV and
 240 mg. of the substance from specimen 2
Specimen 17: 600 mg. of substance X
Specimen 18:
 600 mg. of substance X and
 240 mg. of the substance from specimen 2.

The emulsions are applied onto a support of polyethylene terephthalate, dried and exposed as in Example 4, followed by development for 6 minutes at 20° C. in the developer of Example 1.

TABLE 8

| Specimen | E | γ | S |
|---|---|---|---|
| 1 | Standard | 0.63 | 0.04 |
| 2 | +1.8° | 0.67 | 0.07 |
| 3 | +2.0° | 0.7 | 0.06 |
| 4 | +4.0° | 0.63 | 0.07 |
| 5 | +2.5° | 0.72 | 0.04 |
| 6 | +4.5° | 0.67 | 0.07 |
| 7 | +3.0° | 0.72 | 0.05 |
| 8 | +4.5° | 0.67 | 0.07 |
| 9 | +3.0° | 0.72 | 0.05 |
| 10 | +5.0° | 0.67 | 0.07 |
| 11 | +3.0° | 0.72 | 0.07 |
| 12 | +4.5° | 0.6 | 0.07 |
| 13 | +2.0° | 0.75 | 0.05 |
| 14 | +4.5° | 0.67 | 0.06 |
| 15 | +2.0° | 0.67 | 0.04 |
| 16 | +4.0° | 0.67 | 0.06 |
| 17 | +3.0° | 0.75 | 0.07 |
| 18 | +4.0° | 0.75 | 0.10 |

EXAMPLE 9

The emulsion of Example 4 is panchromatically sensitized and divided into 8 parts to which the following substances are added (based on 1 liter of emulsion):

Specimen A: Control specimen, no additive
Specimen B: 240 mg. of the substance from specimen 2 (Ex. 8)
Specimen C: 120 mg. of substance XXXV
Specimen D:
  120 mg. of substance XXXV and
  240 mg. of the substance from specimen 2 (Ex. 8)
Specimen E: 120 mg. of substance XXV
Specimen F:
  120 mg. of substance XXV and,
  240 mg. of the substance from specimen 2 (Ex. 8).

The specimens are further processed as described in Example 8.

TABLE 9

| Specimen | E | γ | S |
|---|---|---|---|
| A | Standard | 0.7 | 0.05 |
| B | +1.1° | 0.67 | 0.06 |
| C | +1.7° | 0.75 | 0.05 |
| D | +4.2° | 0.75 | 0.07 |
| E | +1.2° | 0.82 | 0.06 |
| F | +3.0° | 0.8 | 0.06 |

EXAMPLE 10

1 g. of each of the following substances is added to 1 liter of a color-forming developer:

Specimen A: Control specimen, no additive
Specimen B: compound XVII
Specimen C: compound XXI
Specimen D: compound XXIV
Specimen E: compound XXVIII The color-forming developer has the following composition:

| | G. |
|---|---|
| Diethyl-p-phenylene diamine sulphate | 2.75 |
| Hydroxylamine sulfate | 1.2 |
| Sodium sulfite (anhydrous) | 2.0 |
| Sodium hexametaphosphate | 2.0 |
| Potassium carbonate (anhydrous) | 75.0 |
| Potassium bromide | 2.0 |
| Water up to 1 liter. | |

A commercial multi-layer color-photographic material is exposed behind a step wedge and processed in the usual manner:

| | Minutes |
|---|---|
| Color development | 7 |
| Intermediate bath | 2 |
| Rinsing | 15 |
| Bleaching bath | 5 |
| Rinsing | 5 |
| Fixing bath | 5 |
| Rinsing | 10 |

The intermediate bath, bleaching bath and fixing bath have the usual compositions.

The color densities of the individual layers of the multi-layer color material are measured with a densitometer "Macbeth Quanta Log, Model TD 102," the particular color filter necessary being inserted in the path of the rays.

In the following table a sensitivity of 200 as against standard=100 represents twice the sensitivity (=1 diaphragm stop).

TABLE 10

| Specimen | Layer with coupler for— | E | γ | S |
|---|---|---|---|---|
| A | Yellow | 100 | 0.6 | 0.25 |
| | Magenta | 100 | 0.7 | 0.22 |
| | Cyan | 100 | 0.6 | 0.20 |
| B | Yellow | 107 | 0.7 | 0.32 |
| | Magenta | 158 | 0.7 | 0.28 |
| | Cyan | 224 | 0.6 | 0.23 |
| C | Yellow | 73 | 0.4 | 0.32 |
| | Magenta | 126 | 0.5 | 0.32 |
| | Cyan | 158 | 0.5 | 0.22 |
| D | Yellow | 48 | 0.3 | 0.27 |
| | Magenta | 100 | 0.7 | 0.41 |
| | Cyan | 174 | 0.6 | 0.20 |
| E | Yellow | 81 | 0.6 | 0.28 |
| | Magenta | 116 | 0.7 | 0.30 |
| | Cyan | 132 | 0.5 | 0.23 |

This example shows how the addition of the aforementioned compounds influences the sensitivity of the individual layers of the multi-layer material in the reverse sequence of their arrangement, i.e., the bottom layer, which normally shows a tendency towards underdevelopment, is subject to the greatest increase.

What is claimed is:

1. A light-sensitive silver halide emulsion which contains a sensitivity increasing amount of a chemical sensitizer of the following formula:

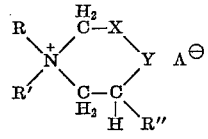

wherein (A) R and R' are alkyl with up to 18 carbon atoms, or aralkyl, or R and R' together represent the ring members necessary for completing a piperidinyl, pyrrolidinyl, morpholinyl, thiomorpholinyl, or piperazinyl ring or the following structure:

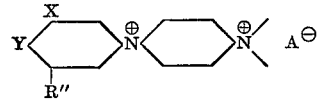

R" is hydrogen, hydroxyl, hydroxyl esterified with an aliphatic carboxylic acid of up to 18 carbon atoms, or —CH$_2$S—Z in which Z is acyl with up to 6 carbon atoms, aminomethyl, alkyl with up to 12 carbons, cycloalkyl, aryl or aralkyl;
Y is O, or a methylene group;
A is a photographically acceptable anion;
(B) when R" is —CH$_2$—S—Z, X is oxygen or sulfur;
(C) when R" is H, OH, hydroxyl esterified with an aliphatic carboxylic acid of up to 18 carbon atoms, X is sulfur.

2. A light-sensitive silver halide emulsion as defined in claim 1, wherein X represents sulfur.

3. A light-sensitive silver halide emulsion as defined in claim 1, wherein the emulsion also contains in an amount that further increases its sensitivity, an additional sensitizer having the formula

in which R''' represents hydrogen or an alkyl, acyl or phenyl group, whilst n represents a number from 8 to 200.

4. A light-sensitive silver halide emulsion as defined in claim 1, wherein the emulsion also contains in an amount that further increases its sensitivity, an additional sensitizer having the formula:

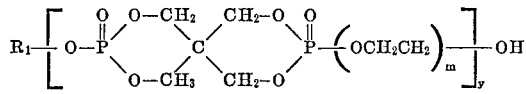

in which $R_1$ represents hydrogen or an alkylene oxide chain with 3 to 100 alkylene oxide units;

m represents a number from 3 to 100 and y represents a number from 1 to 10.

5. A light-sensitive silver halide emulsion as defined in claim 1, wherein R'' represents hydrogen.

6. A light-sensitive silver halide emulsion as defined in claim 1, wherein the chemical sensitizer has the formula

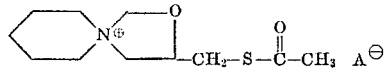

7. A light-sensitive silver halide emulsion as defined in claim 1, wherein the chemical sensitizer has the formula

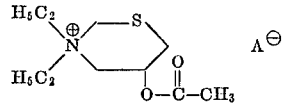

8. A light-sensitive silver halide emulsion as defined in claim 1, wherein the chemical sensitizer has the formula

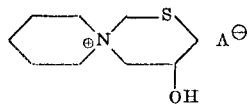

9. In the process for the production of photographic images by exposing a light-sensitive photographic material containing at least one silver halide emulsion layer, and developing and fixing the exposed layer, the improvement according to which the exposed material is developed in effective contact with a sensitivity-increasing amount of a chemical sensitizer of the formula:

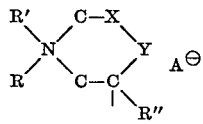

wherein (A) R and R' are alkyl with up to 18 carbon atoms, or aralkyl, or R and R' together represent the ring members necessary for completing a piperidinyl, pyrrolidinyl, morpholinyl, thiomorpholinyl, or piperazinyl ring or the following structure:

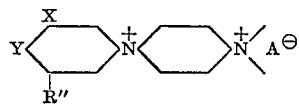

R'' is hydrogen, hydroxyl, hydroxyl esterified with an aliphatic carboxylic acid of up to 18 carbon atoms, or —CH₂—S—Z in which Z is acyl with up to 6 carbon atoms, aminomethyl, alkyl with up to 12 carbon atoms, cycloalkyl, aryl or aralkyl;

Y is O, or a methylene group; and

A is a photographically acceptable anion;

(B) when R'' is —CH₂S—Z, X is oxygen or sulfur;

(C) when R'' is H, OH, hydroxyl esterified with an aliphatic carboxylic acid of up to 18 carbon atoms, X is sulfur.

10. The process as claimed in claim 9, wherein the development is effected with the exposed material also in contact with an additional sensitizer having the formula

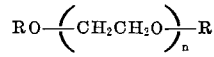

in which R represents hydrogen or an alkyl, acyl or phenyl group, whilst n represents a number from 8 to 200 the amount of additional sensitizer being sufficient to further increase the sensitivity of the photographic material.

11. The process as claimed in claim 9, wherein the development is effected with the exposed material also in contact with an additional sensitizer having the formula:

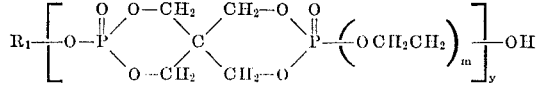

in which $R_1$ represents hydrogen or an alkylene oxide chain with 3 to 100 alkylene oxide units;

m represents a number from 3 to 100 and y represents a number from 1 to 10 the amount of additional sensitizer being sufficient to further increase the sensitivity of the photographic material.

12. The process as claimed in claim 9, wherein the chemical sensitizer has the formula:

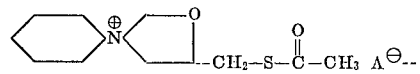

13. The process as claimed in claim 9, wherein the chemical sensitizer has the formula

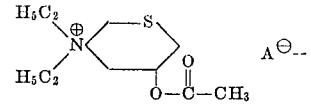

14. The process as claimed in claim 9, wherein the chemical sensitizer has the formula

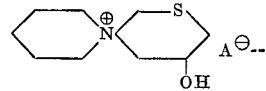

References Cited

UNITED STATES PATENTS

| | | | |
|---|---|---|---|
| 3,471,296 | 12/1966 | Huckstadt et al. | 96—107 |
| 2,886,437 | 5/1959 | Piper | 96—107 |
| 3,210,191 | 10/1965 | Willems et al. | 96—107 |
| 3,294,540 | 12/1966 | Goffe | 96—107 |
| 3,333,959 | 8/1967 | Hayakawa et al. | 96—107 |
| 3,385,708 | 5/1968 | Grabhoefer et al. | 96—107 |

OTHER REFERENCES

Cossar et al.: Journal of Heterocyclic Chemistry, vol. 2 (1965), pp. 430–440.

WILLIAM D. MARTIN, Primary Examiner

M. SOFOCLEOUS, Assistant Examiner

U.S. Cl. X.R.

96—107